Feb. 16, 1926. 1,572,920
G. C. GEROW
COMBUSTION APPARATUS AND METHOD
Filed Jan. 16, 1925 5 Sheets-Sheet 1

INVENTOR
George C. Gerow
BY
Chas. F. Ricks
ATTORNEY

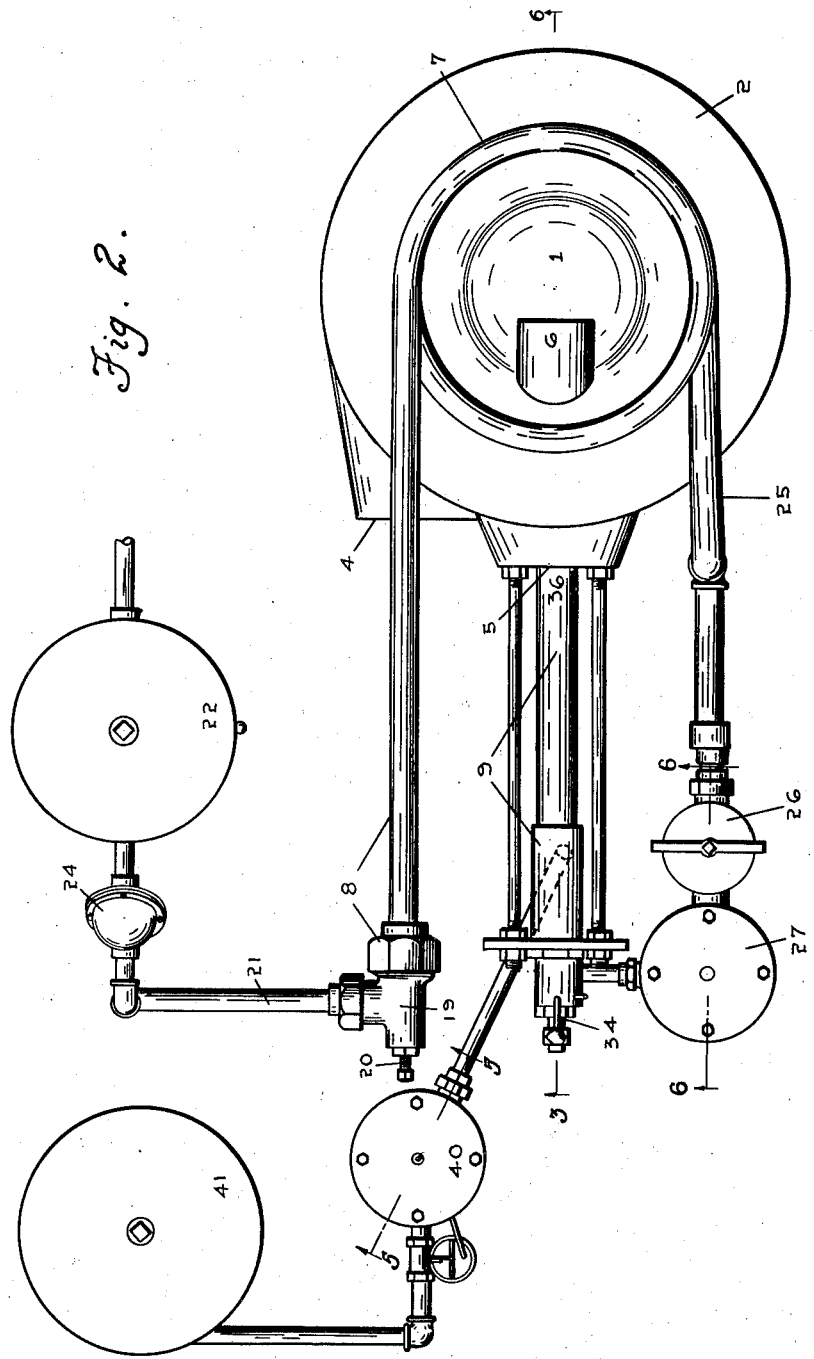

Feb. 16, 1926.
G. C. GEROW
1,572,920
COMBUSTION APPARATUS AND METHOD
Filed Jan. 16, 1925     5 Sheets-Sheet 3
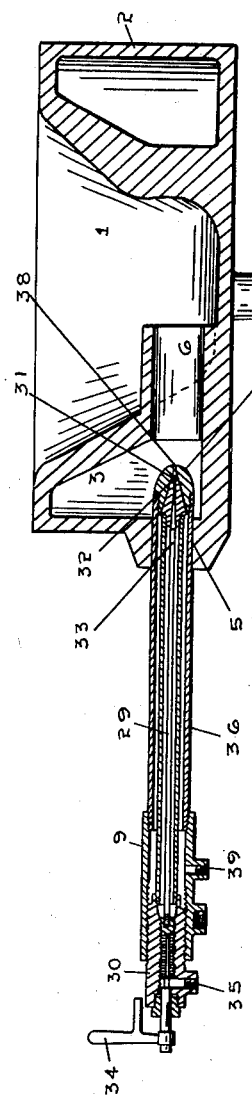
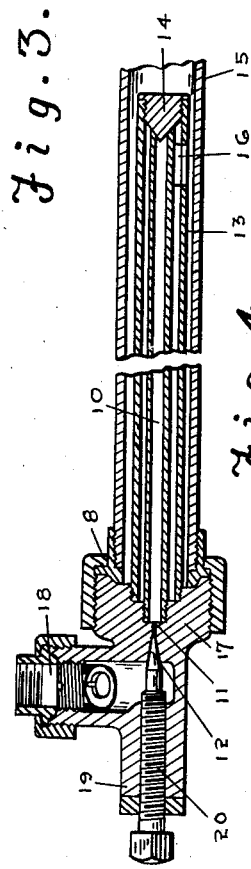
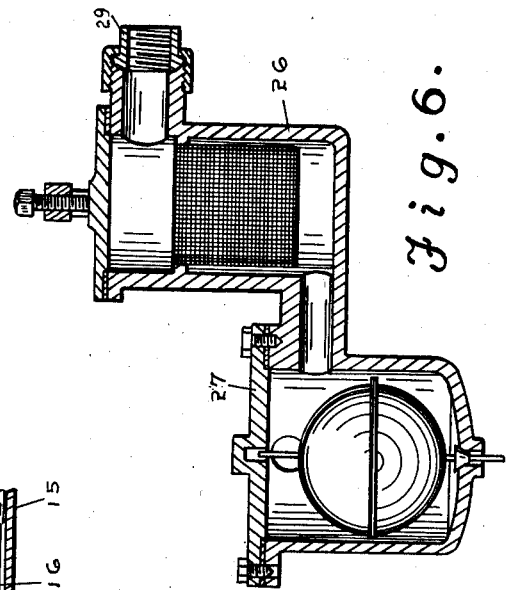
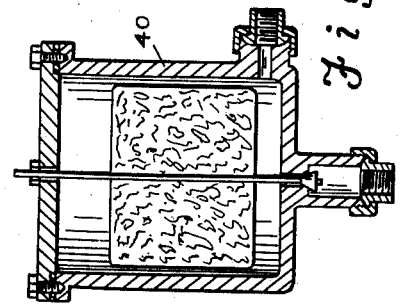
INVENTOR
George C. Gerow
BY
Chas H Ricks
ATTORNEY Feb. 16, 1926.

G. C. GEROW 1,572,920

COMBUSTION APPARATUS AND METHOD

Filed Jan. 16, 1925    5 Sheets-Sheet 4

INVENTOR
George C. Gerow
BY
Chas. R. Rich
ATTORNEY

Feb. 16, 1926.  
G. C. GEROW  
1,572,920  
COMBUSTION APPARATUS AND METHOD  
Filed Jan. 16, 1925  
5 Sheets-Sheet 5

INVENTOR  
George C. Gerow  
BY  
ATTORNEY

Patented Feb. 16, 1926.

1,572,920

UNITED STATES PATENT OFFICE.

GEORGE CARLETON GEROW, OF OTTAWA, ONTARIO, CANADA, ASSIGNOR OF EIGHT-TWENTIETHS TO WILLIAM JOSEPH PRESS, ONE-TWENTIETH TO WILLIAM C. ARNOLD, ONE-TWENTIETH TO JAMES LEWIS KEMP, AND TWO-TWENTIETHS TO EDITH PRESS, ALL OF OTTAWA, CANADA.

COMBUSTION APPARATUS AND METHOD.

Application filed January 16, 1925. Serial No. 2,809.

*To all whom it may concern:*

Be it known that I, GEORGE CARLETON GEROW, a British subject, of the city of Ottawa, in the county of Carleton and Province of Ontario, Dominion of Canada, have invented certain new and useful Improvements in Combustion Apparatus and Methods; and I hereby declare that the following is a full, clear, and exact description of the same.

My invention relates to a combustion apparatus and method which consists of heating fuel oil, under such conditions of temperature and pressure as to, theoretically, crack the oil into lower boiling or "lighter" hydrocarbon fractions and combining with these hydrocarbon fractions a current of preheated air and a current of superheated steam to form a carburetted vapor mixture that enters the combustion zone at approximately the same temperature as that of the burnt gases and results in the complete combustion of the fuel.

To this end I use a jacketed burner having air and oil inlets so located with respect to the inlet of the combustion zone that a current of atmospheric air, entering through the air inlet, is compelled to make a substantially complete circuit of the combustion bowl and is heated, by radiation, to substantially the same temperature as the combustion zone.

Fuel oil is delivered by a suitable injector to the oil inlet and discharged in an atomized condition into and through the preheated atmospheric air to form the carburetted mixture. Superheated steam is used for heating the fuel oil and this superheated steam is obtained by passing a stream of water into and through the combustion zone. After passing through the combustion zone the superheated steam is conducted through an oil injector and theoretically cracks the oil into lower boiling hydrocarbon fractions which are discharged from the injector in an atomized condition to carburet the preheated air.

For an understanding of the invention reference is to be had to the following description and to the accompanying drawings, in which:—

Fig. 1 is an elevational view of an apparatus suitable for carrying out the method, Fig. 2 is a plan view of the same, Fig. 3 is a vertical sectional view of the burner and the injector, showing the feed of the oil and steam shut off.

Fig. 3ª is a similar view to Fig. 3 of the injector showing the feed open for the discharge of the oil and steam into the burner bowl, Fig. 4 is a sectional view of the steam generator with the flow shut off.

Fig. 4ª is a similar view to Fig. 4 with the flow open,

Fig. 5 is a sectional detail view of the float valve regulating the oil feed, and Fig. 6 is a sectional view showing the strainer and trap for the steam feed.

Like characters of reference refer to like parts throughout the specification and drawings.

Figure 1:
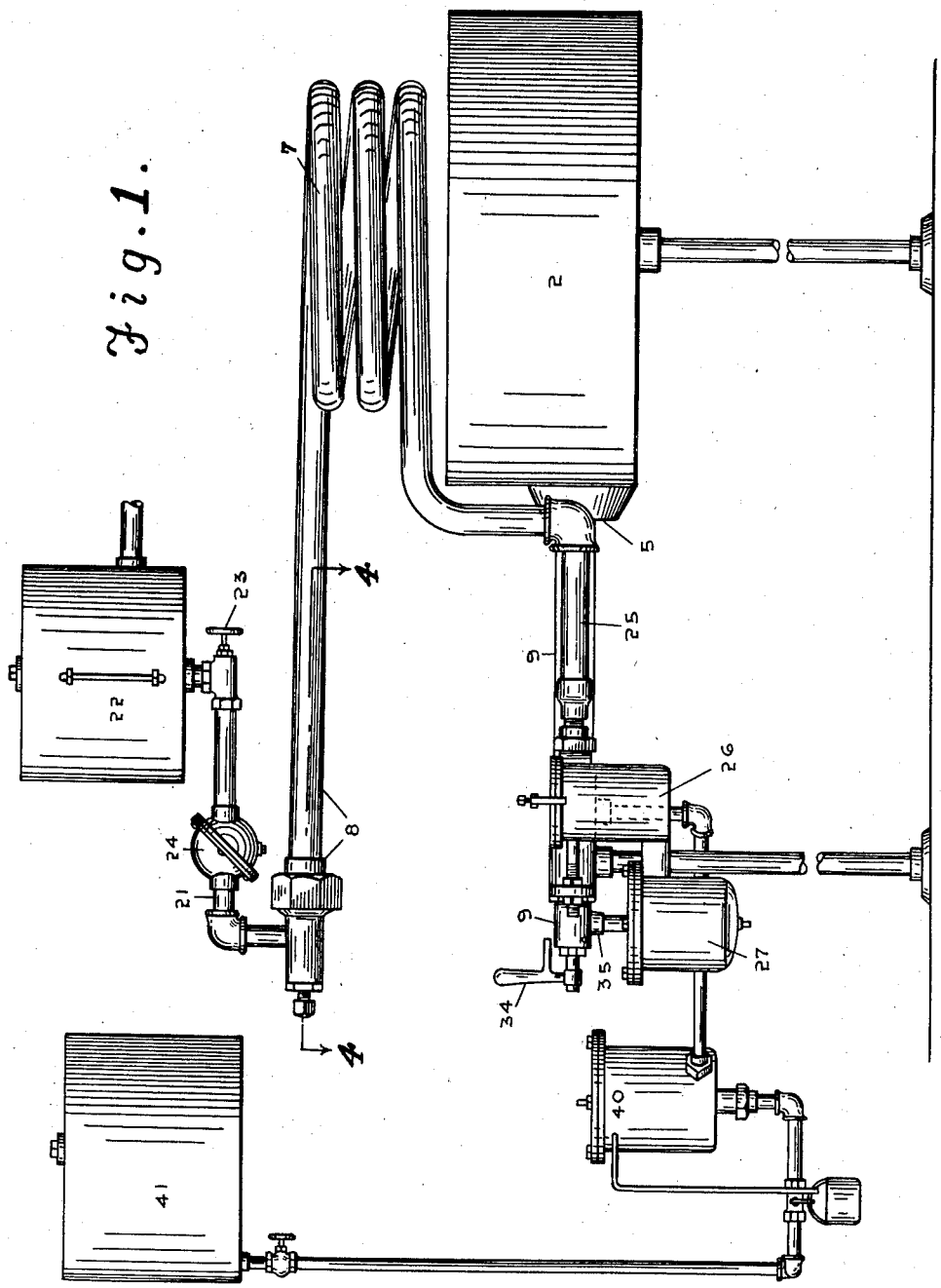
Figure 3A:
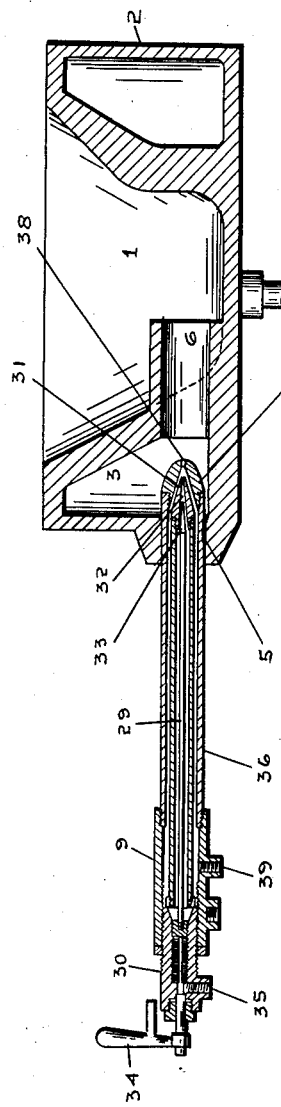

In carrying out the invention I make use of a peculiarly constructed burner comprising a combustion bowl 1 formed with an inlet 6, an enclosing jacket 2 for the bowl, and a partition or baffle 3 extending from the combustion bowl to the jacket. On one side of the baffle or partition 3 is an air inlet 4 and on the other side is an oil inlet 5 in line with the inlet 6. Atmospheric air, circulating from the inlet 4, to a locus in the vicinity of the inlet 5 makes a substantially complete circuit of the combustion bowl before it can pass through the inlet 6 and is heated, by radiation, as it moves between the inlet 4 and its terminal position, to approximately the same temperature as that of the combustion zone.

Oil entering through the inlet 5 carburets the preheated air and the mixture of oil, carburetted air, and superheated steam enters the combustion bowl through the inlet 6; this mixture when ignited burning with complete combustion, and the heated products of the combustion zone being utilized for generating and superheating the steam that is employed to heat the oil. For superheating the steam a coil 7, placed within the combustion zone, is connected with a steam generator 8 and with the injector 9. This steam coil or steam superheater 7 is located in the hottest part of the combustion zone and the temperature of the steam passing through it ranges from 500° C. to 800° C.

The steam generator 8 is located beyond the hottest part of the combustion zone but sufficiently close to it to enable the heated products of combustion to convert the water within it into steam and from the generator the steam passes immediately to the steam coil or superheater.

Figure 4A:
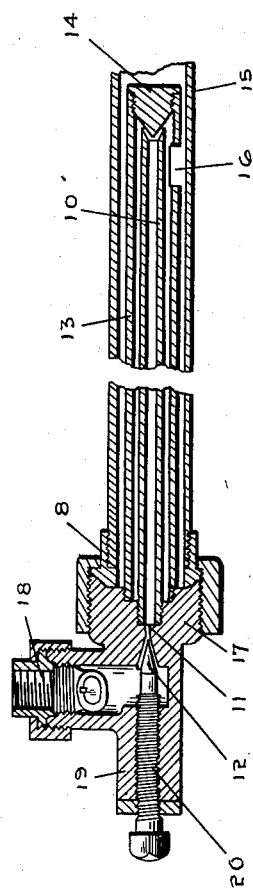
Figure 7:
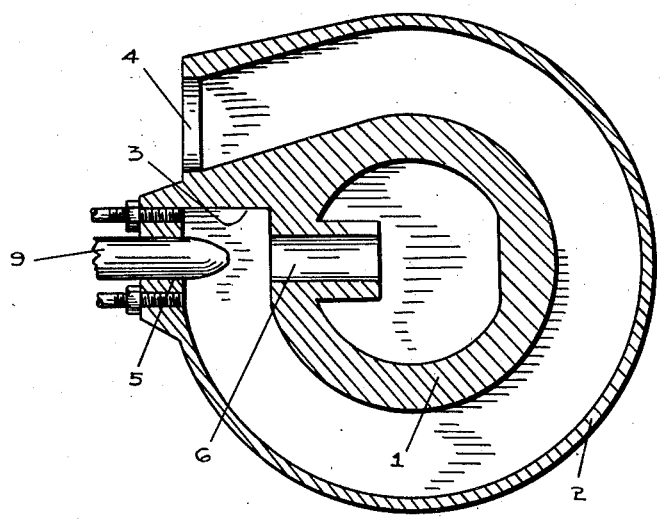
Fig. 7 is a horizontal section of the burner.

The steam generator, as shown in Figs. 4 and 4ª, consists of a central tube 10 into which the water enters through a port 11 controlled by an adjustable inlet valve 12. This central tube 10 is preferably made of nickel steel and is surrounded by a tube 13 of brass or other metal having a greater coefficient of expansion than that of the central tube 10. The tube 13 is slightly longer than the tube 10 and is provided with a conical plug 14 which when the tube 13 is cool and contracted seals the discharge end of the tube 10. Enclosing the tube 13 is a tube 15, which is part of the steam coil or superheater 7, and formed through the tube 13 is a port 16 through which fluid flowing from the tube 10 passes to the tube 15. The tubes 10, 13 and 15 are connected to a valve body 17 through which is formed the port 11 communicating with the central tube 10 and with a water-way 18. The valve body 17 has an internally threaded barrel 19 in line with the axis of the central tube 10 and adjustable through the barrel is the screw-threaded shank 20 of the needle valve 12, controlling the flow from the water-way 18 through the port 11 to the central tube 10.

The water-way 18 is connected by a pipe 21 with the water tank 22 and this pipe 21 is fitted with a control valve 23 and strainer 24. The tank 22 is at a higher elevation than the steam generator 8 and the steam coil or superheater 7 and the water within the tank flows by gravity through the pipe 21 to the water-way 18 from which it enters the central tube 10 through the port 11.

The heat from the combustion zone causes the expansion of the tube 13 and this expansion results in the conical plug 14 being withdrawn from the end of the tube 10 thereby opening the passage from the tube 10 through the tube 13 and port 16 to the tube 15. The fluid during this passage through the tube 10 to that part of the tube 15 surrounding the steam generator is converted into steam and the steam continues its course through the tube 15 to the steam coil or superheater 7. This coil or superheater being in the hottest part of the combustion zone, the steam within it is superheated to a temperature corresponding to that of the burnt products, which temperature ordinarily ranges from 500° C. to 800° C.

From the coil 7 the superheated steam passes through a pipe 25 to the strainer 26 and trap 27 from which it enters the injector 9. This injector consists of a central tube 29 connected at one end to a valve body 30 and having at the other end a tapered plug 31 with a steam-way 32 through it in line with the axis of the tube 29. Within the valve body 30 and tube 29 is an elongated needle valve 33, the point of which is entered in the steam-way 32. The shank of the needle valve 33 extends through and beyond the valve body 30 and is provided with a handle or lever 34 by which the adjustment of the needle valve is effected.

Formed through the valve body 30 is a steam port 35 communicating with the bore of the tube 29 and this port 35 is connected with the steam trap 27 from which superheated steam passing through the strainer and trap enters the tube 29 and passes out through the steam-way 32 when the needle valve 33 is adjusted for that purpose.

Surrounding the tube 29 is a jacket 36 one end of which is connected with the valve body 30 and the other end of which is closed by a conical plug 37, having a conical port 38 through it and entered in the conical port 38 is the tapered plug 31. The tube 29 is preferably of nickel steel and the jacket 36 is preferably brass so that the coefficient of expansion of the jacket will be greater than that of the tube whereby the jacket when cool will contract the conical plug 37 against the tapered plug 31 and the latter will close the port 38 and automatically shut off the flow of oil through the jacket to the oil inlet 5. The jacket 36 is provided with an inlet port 39 connected through a float controlled feed 40 with the oil tank 41.

The oil feeds from the tank 41 through the float feed 40 to the inlet port 39 through which it enters the jacket 36 and flows to the conical port 38. It has been previously stated that the steam flows from the steam superheater 7 through the central tube 29 to the steam-way 32 through the plug 31 and that the temperature of the steam within the tube 29 is approximately in the neighbourhood of from 500° to 800° C. This temperature is above the recognized cracking temperatures for fuel oil and with this temperature, combined with the pressure which normally exists within the jacket it, theoretically, follows that the oil is cracked or broken down into a lower boiling hydrocarbon fraction before passing out through the port 38.

The formation of the conical port 38 and the tapered plug 31 together with the pressure within the injector breaks up or atomizes the oil and delivers it in a comminuted condition through the oil inlet 5. The steam under pressure and flowing rapidly through the central tube 29, steam-way 32 and port 38 creates a suction that draws the oil through the jacket 36 and helps to atomize or comminute it. The atomized oil passes through the preheated air within the jacket 2 and carburets it and continuing its course under pressure enters the combustion zone through the nozzle or inlet 6. The steam as it passes from the inlet 5 to the combustion zone combines with the oil and carburetted air before, during, and after their passage through the nozzle or inlet 6 and when this mixture of oil, steam and air reaches the interior of the combustion bowl 1 it is instantly vaporized by the heat and ignited and burnt with complete combustion.

Having thus fully described my invention what I claim as new and desire to secure by Letters Patent is:—

A combustion apparatus which comprises a jacketed burner having air and oil inlets separated by a baffle for the circulation of the air current around the combustion zone of the burner, and an inlet into the combustion zone in line with the oil inlet, in combination with a steam coil located in the combustion zone and connected through a steam generator with a water supply, whereby the water is converted into steam and the steam is superheated, an injector having a duct connected with the steam coil and a surrounding channel for the oil, and an oil supply connected with said channel, said injector delivering the atomized oil and steam through the oil inlet into the jacketed burner.

Dated at the said city of Ottawa, this 2nd day of January, A. D. 1924.

GEORGE CARLETON GEROW.